US008875125B2

(12) United States Patent
Liles et al.

(10) Patent No.: US 8,875,125 B2
(45) Date of Patent: Oct. 28, 2014

(54) OPERATION SYSTEM INSTALLATION METHODS AND MEDIA

(75) Inventors: Terry Wayne Liles, Round Rock, TX (US); Sudhir Shetty, Cedar Park, TX (US); Charles T. Perusse, Jr., Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 1265 days.

(21) Appl. No.: 12/360,851

(22) Filed: Jan. 27, 2009

(65) Prior Publication Data

US 2010/0192145 A1    Jul. 29, 2010

(51) Int. Cl.
*G06F 9/445* (2006.01)

(52) U.S. Cl.
CPC ... *G06F 8/60* (2013.01); *G06F 8/61* (2013.01)
USPC .......................................................... 717/174

(58) Field of Classification Search
CPC ................................................ G06F 8/60–8/78
USPC ............... 717/101–178; 713/2, 164; 711/161, 711/E12.103; 709/201, 203, 220, 226; 710/62; 719/321, 327; 707/999.202; 714/E11.207
See application file for complete search history.

(56) References Cited

U.S. PATENT DOCUMENTS

| | | | |
|---|---|---|---|
| 6,598,223 B1 | 7/2003 | Vrhel, Jr. et al. | |
| 6,697,852 B1 * | 2/2004 | Ryu | 709/220 |
| 6,795,965 B1 * | 9/2004 | Yadav | 717/168 |
| 6,807,665 B2 * | 10/2004 | Evans et al. | 717/175 |
| 6,816,964 B1 * | 11/2004 | Suzuki et al. | 713/2 |
| 6,854,112 B2 * | 2/2005 | Crespo et al. | 717/174 |
| 6,889,376 B1 * | 5/2005 | Barritz et al. | 717/175 |
| 6,976,252 B2 * | 12/2005 | White et al. | 717/174 |
| 6,999,995 B2 * | 2/2006 | Khanna et al. | 709/208 |
| 7,222,339 B2 | 5/2007 | Rothman et al. | |
| 8,245,293 B2 * | 8/2012 | Huang | 726/20 |
| 8,326,449 B2 * | 12/2012 | Hartz et al. | 700/200 |
| 2003/0217192 A1 * | 11/2003 | White et al. | 709/321 |
| 2004/0254978 A1 * | 12/2004 | Ibanez et al. | 709/203 |
| 2005/0204363 A1 * | 9/2005 | Bezanson et al. | 719/321 |
| 2006/0005016 A1 * | 1/2006 | Lee et al. | 713/164 |
| 2006/0168372 A1 * | 7/2006 | Smith et al. | 710/62 |
| 2006/0184650 A1 * | 8/2006 | Abali et al. | 709/220 |
| 2006/0294515 A1 * | 12/2006 | Gimpl et al. | 717/174 |
| 2007/0101342 A1 * | 5/2007 | Flegg et al. | 719/321 |
| 2007/0118654 A1 * | 5/2007 | Jamkhedkar et al. | 709/226 |
| 2007/0169116 A1 * | 7/2007 | Gujarathi et al. | 717/174 |

(Continued)

OTHER PUBLICATIONS

Automated Installation of Linux Systems Using Yast—Dirk Hohndel and Fabian Herschel—Proceedings of LISA '99: 13th Systems Administration Conference Seattle, Washington, USA, Nov. 7-12, 1999.*

*Primary Examiner* — Lewis A Bullock, Jr.
*Assistant Examiner* — Francisco Aponte
(74) *Attorney, Agent, or Firm* — Baker Botts L.L.P.

(57) ABSTRACT

A method for out-of-band installation and provisioning of an operating system in an information handling system is provided. The method may include sending an OS installation request to a management controller, which may include an internal persistent storage Furthermore, the method may include selecting a selected OS driver pack in response to the OS installation request and exposing the selected OS driver pack to a target server. Finally, the method may include installing the OS with the selected OS driver pack onto the target server.

16 Claims, 3 Drawing Sheets

(56) References Cited

U.S. PATENT DOCUMENTS

| | | | |
|---|---|---|---|
| 2007/0234346 A1* | 10/2007 | Kramer et al. | 717/174 |
| 2007/0239861 A1* | 10/2007 | Reeves et al. | 709/222 |
| 2008/0005733 A1* | 1/2008 | Ramachandran et al. | 717/168 |
| 2008/0127170 A1* | 5/2008 | Goldman et al. | 717/174 |
| 2009/0138876 A1* | 5/2009 | Chang | 717/176 |
| 2009/0144514 A1* | 6/2009 | Lamantia et al. | 711/161 |
| 2009/0287900 A1* | 11/2009 | Kirscht et al. | 711/173 |
| 2009/0307477 A1* | 12/2009 | Matthew et al. | 713/2 |
| 2010/0042988 A1* | 2/2010 | Lundin et al. | 717/176 |
| 2010/0107155 A1* | 4/2010 | Banerjee et al. | 717/177 |

* cited by examiner

OPERATION SYSTEM INSTALLATION METHODS AND MEDIA

TECHNICAL FIELD

The present disclosure relates generally to the field of information handling systems, and more specifically, to the provisioning and deployment of operating systems.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In an enterprise environment employing multiple IHSs, operating system (OS) installation or deployment may pose a significant issue due to the sheer number of systems. Currently, OS deployment techniques may include scripted OS installations and image-based OS installations, which may both provide forms of semi-automated installation of multiple operating systems across various IHSs. In both instances, however, there may exist several manual steps to complete OS deployment, which may give rise to inefficiencies in cost, labor, and time. For example, current methodologies may require an administrator to determine the asset inventory in the enterprise such as appropriate platforms, setting, applications, and the like. Furthermore, the administrator may need to download specific drivers from CD ROMs, online sites, and other locations for a multitude of platforms and operating systems. In addition, files used in OS deployment may need to be constantly updated in order to point to such drivers in the event of newly required drivers for new applications or updated drivers for current applications. Thus, a need exists for an automatic, out-of-band provisioning and deployment of operating systems.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for deploying an operating system (OS) in an information handling system (IHS). The method may include sending an OS installation request to a management controller. The management controller itself may include an internal persistent storage. Furthermore, the method may include selecting a selected OS driver pack, which may be located on the internal persistent storage, in response to the OS installation request. Additionally, the method may entail exposing the selected OS driver pack to a target server and installing the OS with the selected OS driver pack onto the target server.

Another aspect of the disclosure may provide an information handling system (IHS), which may include a deployment server and a target server in communication with the deployment server. The target server may further include an internal persistent storage, a selected OS driver pack stored on the internal persistent storage, a host domain, and a management controller in communication with the internal persistent storage and the host domain. Moreover, the selected OS driver pack may be selected in response to an OS installation request from the deployment server to the management controller. In addition, an OS may be installed, with the selected OS driver pack, onto the target server.

Yet another aspect of the disclosure provides for a computer-readable medium having computer-executable instructions for performing a method for deploying an operating system (OS) in an information handling system (IHS). The method may include sending an OS installation request to a management controller. The management controller itself may include an internal persistent storage. Furthermore, the method may include selecting a selected OS driver pack, which may be located on the internal persistent storage, in response to the OS installation request. Additionally, the method may entail exposing the selected OS driver pack to a target server and installing the OS with the selected OS driver pack onto the target server.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems, methods, and computer-readable mediums are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the"

may include plural referents unless the context clearly dictates otherwise. Thus, for example, reference to "a server" refers to one or several servers, and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
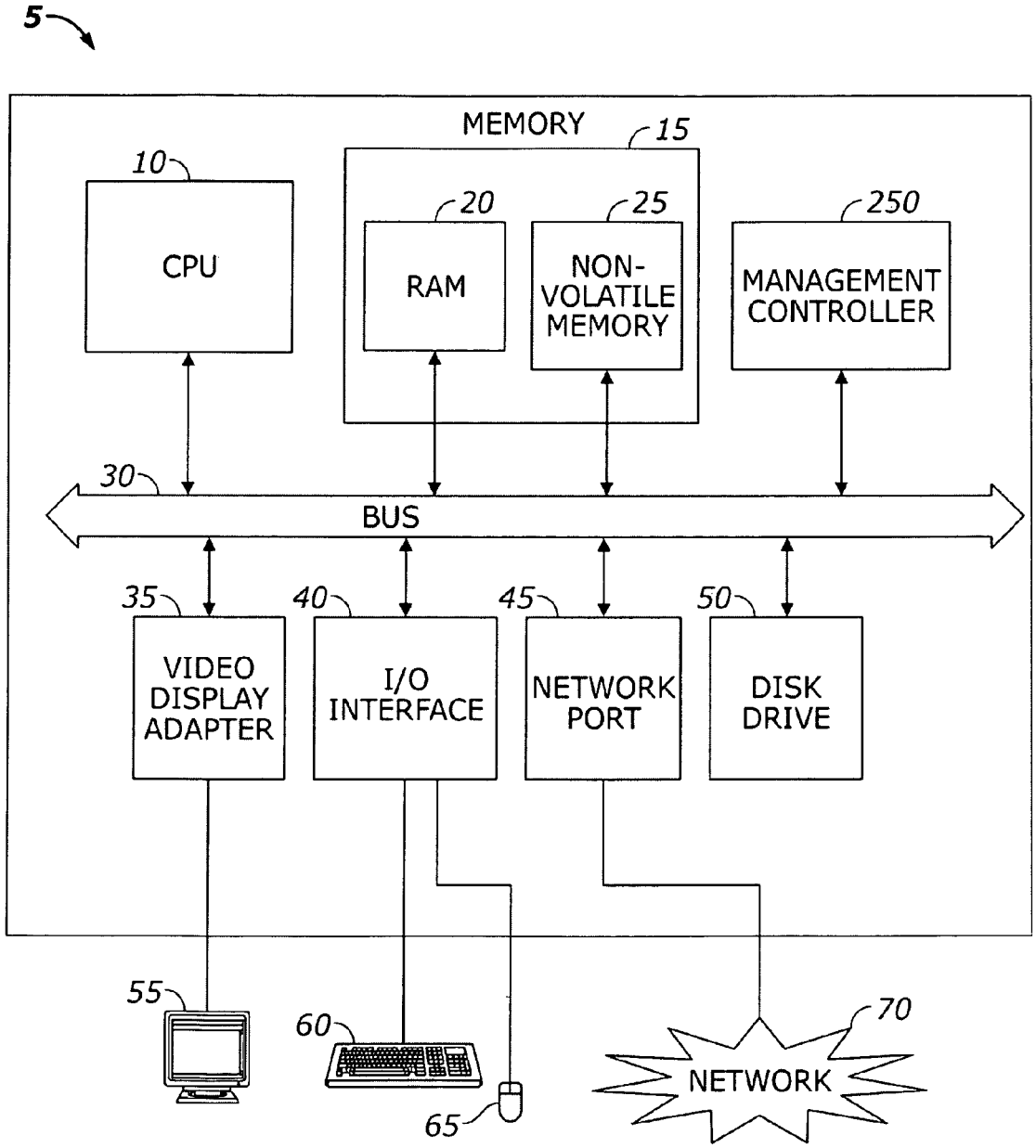
FIG. 1 represents a schematic illustrating an information handling system (IHS) in accordance with one aspect of the present disclosure.

FIG. 1 illustrates one possible implementation of an IHS 5 comprising CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65). Furthermore, a management controller 250 may be coupled to the bus 30. The management controller 250, discussed in more detail in FIG. 2, may generally manage the operations of many devices within the IHS 5.

Figure 2:
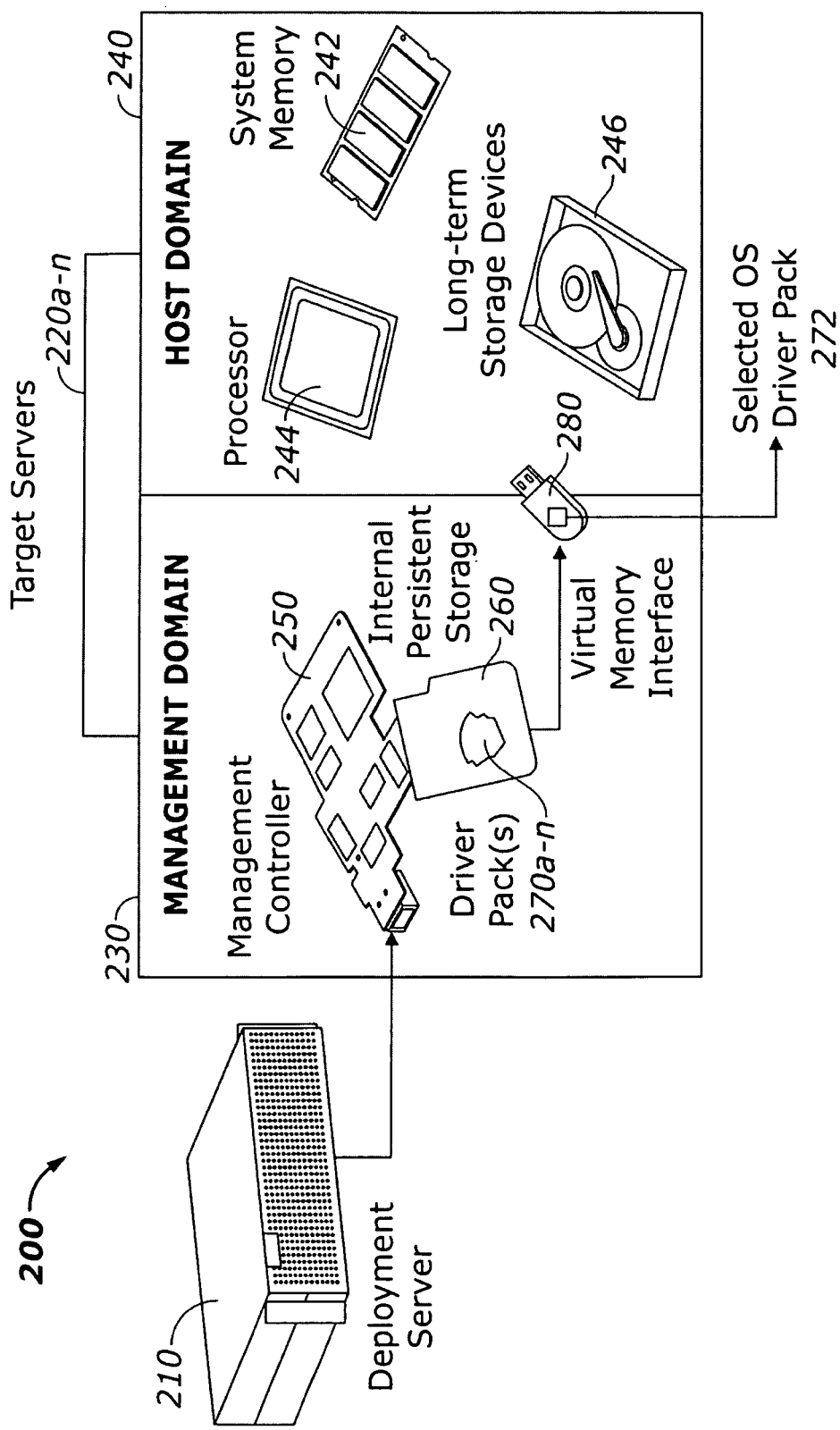
FIG. 2 represents a schematic illustrating an operating system deployment architecture in accordance with one aspect of the present disclosure.

FIG. 2 represents a schematic illustrating an operating system deployment architecture in accordance with one aspect of the present disclosure. At a basic level, the system may include a deployment server 210 and a target server 220a-n. The deployment server may in some instances be referred to as an external console and may generally perform management functions over the operation of the target servers 220a-n. For example, the deployment server 210 may execute platform configurations of the target servers 220a-n, participate in the updating and deployment of operating systems to the target servers 220a-n, and schedule various tasks to be carried out among target servers 220a-n. Furthermore, different manufacturers may refer to the deployment server 210 by different names including, but not limited to, Dell Management Console, Altiris Deployment Server, Microsoft System Center Configuration Manager, and BMC Blade Logic. Each of these servers, though different in name, may provide similar functionality as the deployment server 210.

As used herein, an operating system (OS) may refer to a software component of an IHS that manages the resources of the IHS among various applications. An OS may provide an interface to handle detailed operations of the IHS's hardware in response to an application's needs. Thus, the OS may relieve applications from having to manage or understand hardware details, thereby making applications easier to write. Examples of operating systems include, but are not limited to, Windows, Linux, and Macintosh. Further, an application may be computer software that directly benefits and responds to the needs of a user to perform particular tasks. For example, word processors, spreadsheets, media players, computer games, and the like may all be considered applications.

Each target server 220a-n may be separated into a management domain 230 and a host domain 240. A domain, in the present context, may refer to any set of components that work together toward a common functionality. Thus, the management domain 230 may generally provide management capabilities of the target servers 220a-n to users while the host domain 240 may generally facilitate the regular operation of the target servers 220a-n. The management domain 230 may include a management controller 250 to provide out-of-band management of the target server 220a-n. Out-of-band may refer to using a means of communication separate from normal channels. To this end, out-of-band management may include managing devices through a distinct line of communication rather than through regular data channels used by the managed devices. Thus, employing out-of-band management may provide administrators the ability to monitor IHS devices and components regardless of whether they are powered on and/or whether the regular data channels are operating normally.

The management controller 250 may manage the target server 220a-n by monitoring the temperature of various components, controlling its power levels and consumption (e.g., regulating the speed of its fans), updating various server configurations, and performing various other tasks. Examples, of management controllers 250 may include, but are not limited to, Dell Baseboard Management Controller, Dell Remote Access Controller and Integrated Dell Remote Access Controller. In addition, the management controller 250 may aid in the deployment of operating systems by communicating with the deployment server 210 through a secure connection, a process discussed in further detail in FIG. 3. Furthermore, the management controller 250 may include an internal persistent storage 260. The internal persistent storage 260 may be embedded on the management controller 250 and may be any suitable memory device such as flash memory, read only memory, random access memory and/or the like. It should be noted that one skilled in the art would understand the internal persistent storage to be any other device capable of retaining data when powered off and is not limited to only flash memory. Moreover, driver packs 270a-n may be stored on the internal persistent storage 260. The driver packs 270a-n may contain drivers necessary to the installation for various different operating systems and may also contain files storing user preferences and settings associated with the installations. For example, a target server 220a-n engaging in a Windows Server 2003 installation may require a different driver pack 270a-n than if it were installing Windows Server 2008. Similarly, different user preferences concerning an OS installation may produce a change in the selection of the driver packs 270a-n as well.

In order to facilitate the transfer of the driver packs 270a-n to the host domain 240, a virtual media interface 280 may be employed. The host domain 240 may refer to a collection of components not located within the management domain 230 that operate to perform the primary tasks of the target server 220a-n such as processing non-management related information, storing data, executing programs, and the like. Indeed, components of the host domain 240 may include the target server's 220a-n system memory 242, processor(s) 244, long-term storage devices 246, and various other devices, not illustrated, including CD-ROM drives, video cards, network adapters, and/or the like. The virtual media interface 280 may allow communication between the management controller 250 and the host domain 240 by presenting the internal persistent storage, or a partition thereof, as a storage device that the host domain 240 can recognize. To this end, the virtual media interface 280 may simulate the internal persistent storage 260 or a partition thereof as attached media to the host domain 240, thereby exposing the driver packs 270a-n to the host domain 240. As used herein, exposing the driver packs 270a-n may mean presenting the driver packs 270a-n to the host domain 240 on media the OS can identify. For example, the virtual media interface 280 may present a partition of the internal persistent storage 260 as a flash device (e.g., universal serial bus (USB) flash device), a CD-ROM, a floppy disk, and/or the like. Thus, the host domain 24 may be able to read the partition and extract the selected OS driver pack 272, corresponding to the selected OS for installation, from among the driver packs 270a-n.

Figure 3:
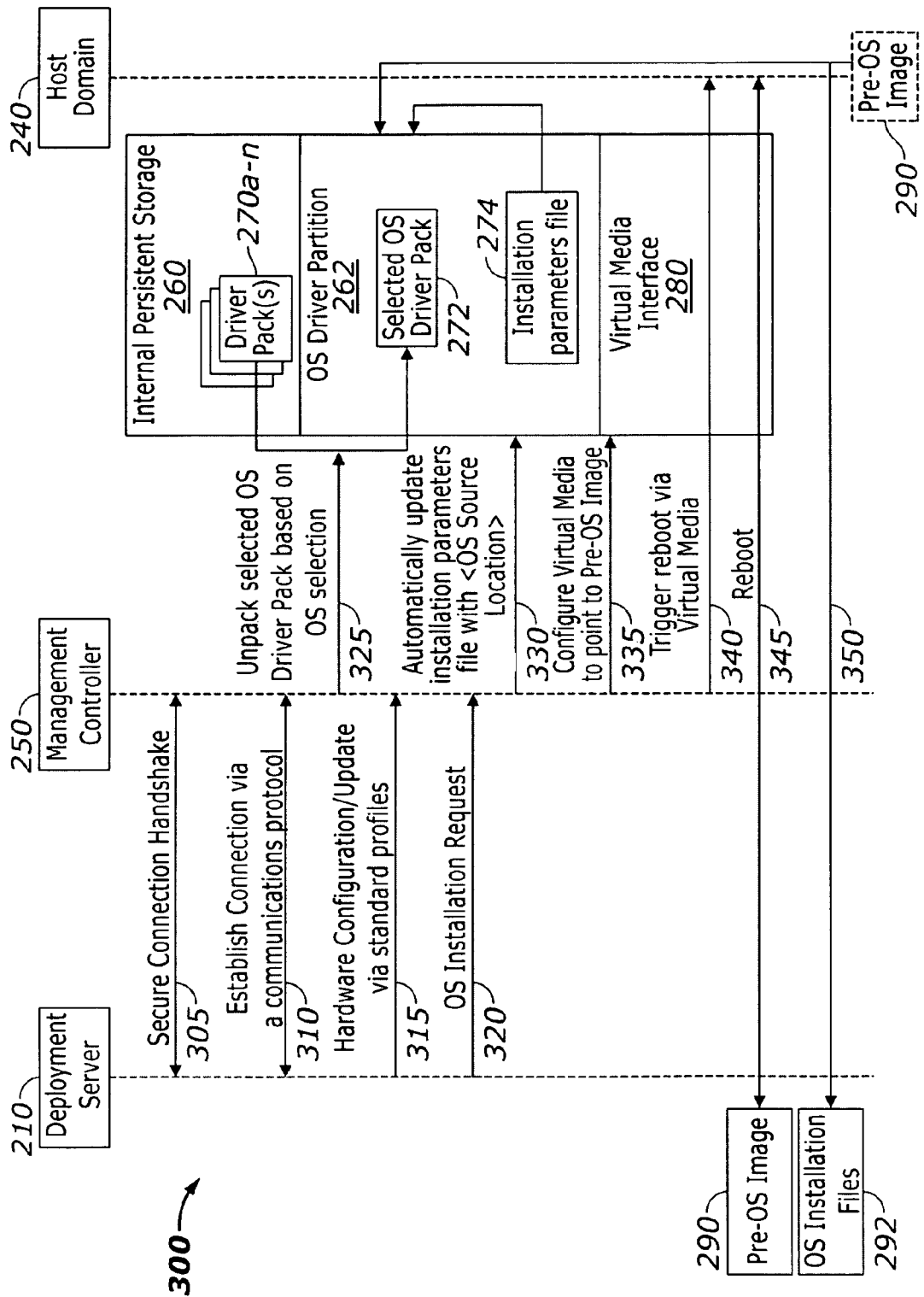
FIG. 3 represents a flow diagram illustrating an operating system deployment method in accordance with one aspect of the present disclosure.

Turning now to FIG. 3, a flow diagram is presented that illustrates an OS installation process, indicated generally at 300, by which an OS may be installed on a target server 220a-n in accordance with one aspect of the present disclosure. The method may begin in step 305, where a secure handshake or authentication process between the deployment server 210 and the management controller 250 may be established. In general, a handshake may be an automated process by which two devices dynamically negotiate parameters for a communication channel, prior to engaging in typical communication over that channel. For example, handshaking may be used to set rules or parameters such as information transfer rate, parity, interrupt procedure, and other protocols. These parameters may be used to establish identity, compatibility, security, and/or the like. Next, the deployment server 210 may pass communication credentials to the management controller 250 to establish a secure connection via a secure communications protocol in step 310. WS-Management may be an example of a standard communications protocol that enables systems across various platforms to access and exchange management information across an entire information technology infrastructure. Thus, WS-Management may allow an administrator to remotely access devices across a network including, but not limited to, individual IHSs, servers, personal display assistants, and silicon components. Furthermore, the establishment of the secure handshake in tandem with the WS-Management connection may provide security against unwanted intrusions into the communications channel between the deployment server 210 and the management controller 250. It should be noted, however, that while the FIG. 3 describes a secure communications channel using a WS-Management connection, other communications protocols are also contemplated within the present disclosure. Moreover, the communications protocol need not be secure, and unsecure protocols such as the Pre-boot Execution Environment (PXE) and the like are also contemplated within the present disclosure.

In step 315, the deployment server 210 may perform hardware configurations on the target server 220a-n. Potential hardware configurations may include initializing a redundant array of independent disks (RAID), organizing specific user settings, configuring the BIOS, and various other tasks. Additionally, through its connection with the management controller 250, the deployment server 210 may determine the appropriate OS to install on the target server 220a-n. Therefore, the deployment server 210 may send an OS installation request to the management controller 250 in step 320. The OS installation request may communicate to the management controller 250 the OS selection (i.e. the OS selected for installation), the Pre-OS image 290 location, the location of OS installation files 292, installation parameters files 274, and other information. A Pre-OS may refer to a program that possesses similar or some functionalities of a full OS. A Pre-OS may be used to prepare a streamlined installation of operating systems across many different servers and computers and may be able to copy disk images from network locations to initiate setup. For example, Windows Preinstallation Environment (Windows PE), which may be considered a Pre-OS, is a minimal Windows compatible operating system with limited services used to prepare a computer for Windows installation used by many original equipment manufacturers (OEMs).

In step 325, based on the OS selected for installation, a selected OS driver pack 272 may be unpacked from driver packs 270a-n on the internal persistent storage 260. The selected OS driver pack 272 may also be unpacked, along with the installation parameters file 274, into an OS driver partition 262 on the internal persistent storage 260. The installation parameters file 274 may be a file containing various settings and parameters that can be manipulated by an administrator or other user to enable an unattended or automatic installation of an OS according to those settings. The installation parameters file 274 may also point to OS driver locations as well as the location of the OS installation files 292. A drawback, however, may be that the administrator or user must manually create the installation parameters file 274 and populate its settings as well as update it should drivers corresponding to the OS also be updated. Therefore, in order to prevent the need for manual creation and/or updating of the installation parameters file 274, the installation parameters file may automatically be updated with drivers from the selected OS driver pack 272 and the location of the OS installation files 292 in step 330. For example, the source location to a file containing the instruction set of the OS selected to be installed may be provided. This instruction set may guide the updating of the installation parameters file 274.

As previously mentioned, the virtual media interface 280 may be capable of providing the OS driver partition 262 and its contents (e.g., the selected OS driver pack 272 and the installation parameters file 274 as attached media to the host domain 240. Consequently, in step 335, the virtual media interface 280, and by extension the OS driver partition 262, may be configured to point to the pre-OS image 290 A reboot of the target server 220a-n may then be triggered in step 340. Also during step 340, the pre-OS image 290 may be dynamically loaded or injected with (i.e., the pre-OS image will have access to) drivers from the selected OS driver pack 272 to facilitate installation of the selected OS. After the reboot in step 345, an OS install may be triggered, which may refer to the installation parameters file 274 to reference the appropriate drivers from the selected OS driver pack 272 in step 350. Thus, the entire OS installation process 300 may be automated and performed, including manipulation of the installation parameters file 274, without the manual input of an administrator or user.

It should be noted, however, that some OS installations may not require a installation parameters file 274 and may have the OS automatically scan any attached media for appropriate drivers. To this end, the OS driver partition 262 of the internal persistent storage 260 may again still be presented as the attached media through the virtual media interface 280, and the OS may scan this partition. Such installation procedures are also contemplated by the present disclosure. Furthermore, the pre-OS image may be preloaded onto the internal persistent storage 260 and/or attached to virtual media. Additionally, the OS installation files 292 may be located within the deployment server 210.

Furthermore, methods of the present disclosure may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that the abovementioned media may take various forms such as cards, tapes, magnetic disks (e.g., floppy disk or hard drive), optical disks (e.g., compact disk read only memory ("CD-ROM") or digital versatile disc ("DVD")) or any other medium/media which can be used to store desired information and which can accessed by an IHS. It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for installing an operating system (OS) in an information handling system (IHS), the method comprising:
    establishing a connection between a deployment server and a management controller of a target server, wherein the deployment server:
        performs a hardware configuration on the target server including at least one of initializing a disk array and configuring a Basic Input/Output System (BIOS); and
        determines the appropriate OS to install on the target server;
    sending an OS installation request from the deployment server to the management controller, wherein the management controller comprises an internal persistent storage;
    selecting a selected OS driver pack stored in the internal persistent storage in response to the OS installation request;
    providing the selected OS driver pack to the target server, wherein providing the selected OS driver pack comprises:
        configuring an OS driver partition of the internal persistent storage to simulate an attached media to the target server via a virtual media interface, wherein an installation parameters file is stored in the OS driver partition, the installation parameters file operable to reference locations of drivers and the location for OS installation files; and
        presenting the selected OS driver pack on the OS driver partition to the target server;
    extracting the selected OS driver pack from the OS driver partition; and
    installing the OS with the selected OS driver pack on the target server.

2. The method of claim 1 further comprising associating the selected OS driver pack with a pre-OS image utilized to install the OS.

3. The method of claim 2, wherein the OS installation request indicates an OS selection, a location for the pre-OS image, a location for OS installation files, or a combination thereof.

4. The method of claim 3, wherein the selected OS driver pack is selected from a plurality of driver packs stored in the internal persistent storage.

5. The method of claim 4 further comprising unpacking the selected OS driver pack onto the OS driver partition within the internal persistent storage.

6. The method of claim 5, wherein the internal persistent storage comprises a flash memory device.

7. The method of claim 1, further comprising updating the installation parameters file with the selected OS driver pack and the location for the OS installation files.

8. An information handling system (IHS) comprising:
    a deployment server;
    a target server in communication with the deployment server, wherein:
        the target server comprises: an internal persistent storage, a selected OS driver pack stored on the internal persistent storage, and a host domain; and
        the domain server, through its communication with the target server, perform a hardware configuration on the target server including at least one of initializing a disk array and configuring a Basic Input/Output System (BIOS), and determines the appropriate OS to install on the target server;
    a management controller in communication with the internal persistent storage and the host domain, wherein:
        an OS driver pack stored in the internal persistent storage is selected in response to an OS installation request from the deployment server to the management controller;
        the selected OS driver pack is provided to the target server, wherein providing the selected OS driver pack comprises:
            configuring an OS driver partition of the internal persistent storage to simulate an attached media to the target server via a virtual media interface wherein an installation parameters file is stored in the OS driver partition, the installation parameters file operable to reference locations of drivers and the location for OS installation files; and presenting the selected OS driver pack on the OS driver partition to the target server;

the selected OS driver pack is extracted from the OS driver partition by the target server; and an OS is installed with the selected OS driver pack onto the target server.

9. The system of claim 8 further comprising a pre-OS image in communication with the host domain, wherein the pre-OS image is utilized to install the OS.

10. The system of claim 9, wherein the pre-OS image is provided with the selected OS driver pack.

11. The system of claim 10, wherein the OS installation request indicates an OS selection, a location for a pre-OS image, a location for OS installation files, or a combination thereof.

12. The system of claim 11, wherein the selected OS driver pack is selected from a plurality of driver packs on the internal persistent storage.

13. The system of claim 12, wherein the selected OS driver pack is unpacked onto the OS driver partition within the internal persistent storage.

14. The system of claim 8, wherein the internal persistent storage is a flash memory device.

15. A non-transitory computer-readable medium having computer-executable instructions for performing a method for deploying an operating system (OS) in an information handling system (IHS), the method comprising:

establishing a connection between a deployment server and a management controller of a target server, wherein the deployment server:

performs a hardware configuration on the target server including at least one of initializing a disk array and configuring a Basic Input/Output System (BIOS); and determines the appropriate OS to install on the target server;

sending an OS installation request from the deployment server to the management controller, wherein the management controller comprises an internal persistent storage;

selecting a selected OS driver pack stored in the internal persistent storage in response to the OS installation request;

providing the selected OS driver pack to the target server, wherein providing the selected OS driver pack comprises:

configuring an OS driver partition of the internal persistent storage to simulate an attached media to the target server via a virtual media interface, wherein an installation parameters file is stored in the OS driver partition, the installation parameters file operable to reference locations of drivers and the location for OS installation files; and presenting the selected OS driver pack on the OS driver partition to the target server;

extracting the selected OS driver pack from the OS driver partition; and installing the OS with the selected OS driver pack on the target server.

16. The non-transitory computer-readable medium of claim 15 further comprising associating the selected OS driver pack with a pre-OS image utilized to install the OS.

* * * * *